(12) United States Patent
Hummel et al.

(10) Patent No.: US 8,686,984 B2
(45) Date of Patent: Apr. 1, 2014

(54) DEVICE FOR PLACEMENT IN FRONT OF A DISPLAY DEVICE

(75) Inventors: Helga Hummel, Aachen (DE); Matthias Wendt, Wuerselen (DE); Hans-Peter Loebl, Monschau-Imgenbroich (DE); Claudia Michaela Goldmann, Kreuzau (DE)

(73) Assignee: Kkoninklijke Philips N.V., Eindhoven (NL)

( * ) Notice: Subject to any disclaimer, the term of this patent is extended or adjusted under 35 U.S.C. 154(b) by 127 days.

(21) Appl. No.: 13/257,768

(22) PCT Filed: Mar. 25, 2010

(86) PCT No.: PCT/IB2010/051307
§ 371 (c)(1),
(2), (4) Date: Sep. 20, 2011

(87) PCT Pub. No.: WO2010/109435
PCT Pub. Date: Sep. 30, 2010

(65) Prior Publication Data
US 2012/0044233 A1    Feb. 23, 2012

(30) Foreign Application Priority Data

Mar. 27, 2009  (EP) ..................................... 09156463

(51) Int. Cl.
*G09G 5/00* (2006.01)

(52) U.S. Cl.
USPC ................ 345/211; 345/32; 345/44; 359/237

(58) Field of Classification Search
USPC ........... 345/30–49, 50–54, 87–104, 204–214; 359/267–274
See application file for complete search history.

(56) References Cited

U.S. PATENT DOCUMENTS

| | | | | |
|---|---|---|---|---|
| 4,800,437 A | * | 1/1989 | Hosoya | 348/207.99 |
| 6,377,237 B1 | * | 4/2002 | Sojourner | 345/102 |
| 6,437,900 B1 | * | 8/2002 | Cornelissen et al. | 359/246 |
| 7,057,681 B2 | * | 6/2006 | Hinata et al. | 349/96 |
| 7,679,808 B2 | * | 3/2010 | Kim | 359/267 |
| 7,786,987 B2 | * | 8/2010 | Nielsen | 345/207 |
| 8,174,489 B2 | * | 5/2012 | Sorensson et al. | 345/105 |
| 8,232,958 B2 | * | 7/2012 | Tolbert | 345/105 |
| 2004/0188671 A1 | | 9/2004 | Tan et al. | |
| 2005/0062410 A1 | * | 3/2005 | Bell et al. | 313/506 |
| 2006/0212895 A1 | * | 9/2006 | Johnson | 725/12 |
| 2006/0232575 A1 | * | 10/2006 | Nielsen | 345/207 |
| 2008/0186560 A1 | | 8/2008 | Kim | |
| 2009/0147185 A1 | * | 6/2009 | Quach | 349/69 |

FOREIGN PATENT DOCUMENTS

| | | |
|---|---|---|
| DE | 102006060781 A1 | 4/2008 |
| EP | 1852731 A1 | 11/2007 |
| WO | 2008104905 A2 | 9/2008 |

OTHER PUBLICATIONS

Klein et al., Translation of DE102006060781A1, Apr. 10, 2008.*

* cited by examiner

*Primary Examiner* — Dmitriy Bolotin

(57) ABSTRACT

A system related to the improvement of the design of display device screens during the off or stand-by state is provided. The system comprises a display device and a device connected to the display device, wherein the device comprises a material having a switchable optical configuration. The display device may e.g. by a TV screen, or any other display such as computer monitors.

11 Claims, 3 Drawing Sheets

DEVICE FOR PLACEMENT IN FRONT OF A DISPLAY DEVICE

FIELD OF THE INVENTION

This invention pertains in general to the field of displays. More particularly the invention relates to a device for placement in front of a display device configured to optically influence the properties of light received by a user when observing said.

BACKGROUND OF THE INVENTION

TV sets steadily increase in screen size and, due to the request for high contrast in operation, feature an almost black screen in the off or stand-by state.

As a matter of fact the increasing demand for high daylight contrast of TV screens resulted in the development of many measures for contrast enhancement (phosphor coatings, application of black pigments between the RGB pixels, glass coloration, etc.). The overall effect of these contrast enhancement measures is the reduction of the albedo of the TV screen. Nowadays, this has been driven to such an extent, that TV screens are almost completely black. In other words, a large and flat TV screen in the off or stand-by state appears as a "black stain" at the wall, which might have a negative impact to the cozy atmosphere of living rooms.

Commonly, walls onto which the TV set is installed are white or painted with a light color. This results in an unpleasant contrast to the dark screen that is hanging on the wall whenever the TV set is switched off. Some TV sets having backlight capabilities offer the option to switch on the backlight during the TV off state to obtain a cozy atmosphere, but the TV screen itself remains black.

Hence, an improved system would be advantageous.

SUMMARY OF THE INVENTION

Accordingly, the present invention preferably seeks to mitigate, alleviate or eliminate one or more of the above-identified deficiencies in the art and disadvantages singly or in any combination and solves at least the above-mentioned problems by providing a system according to the appended patent claims.

According to an aspect a system is provided. The system comprises a display device being configured to operate in an on state, off state or stand-by state. The system further comprises a device connected to the display device, said device comprising a material having a switchable optical configuration, by means of at least one changeable optical characteristic. The system further comprises a control unit configured to control the optical characteristic of the device based on the operation state of the display device.

An advantage of the system according to some embodiments is that when the display device is set to its off state or standby state, the control unit may change an optical characteristic in the device, which may be placed in front of the display device screen, thereby changing the visual appearance of the display device screen during off or standby state. For example, the device may be set to highly reflective during the off state or standby state of the display device, thereby introducing a mirror-like visual appearance. In another example, a light effect is emitted from the device when the display device is in its off state or standby state.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

An idea of the present invention is to provide a device 12, 22, 32 for placement in front of a display device 11, such as a TV screen, to change the optical properties of light received by a user observing said display device, when the display device is in an off state or standby state, while when the display device is in an on state, the device 12, 22, 32 appears transparent.

The following description focuses on embodiments of the present invention applicable to a display system and in particular to a system comprising a display device and a device, whose optical appearance is changeable.

Figure 1:
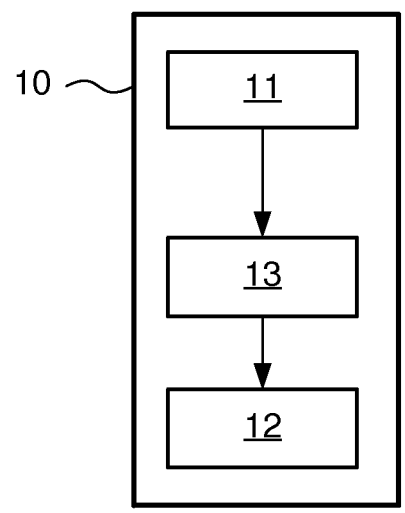
FIG. 1 is a block scheme of a system according to an embodiment.

In an embodiment, according to FIG. 1, a system 10 is provided. The system comprises a display device 11 configured to display image content on a screen thereof, when operating in on state. The display device further may operate in an off state or a standby state in which no image content is displayed on the screen. The system further comprises a device 12. The device comprises a material having a switchable optical configuration, by means of at least one changeable optical characteristic. The system further comprises a control unit 13 configured to control the optical characteristic based on the operation state of the display device 11. For example, the control unit 13 is configured to set the device 12 to its on state and a first optical configuration when an off state or standby state of said display device 11 is detected.

In an embodiment the display system is configured to directly signal to the control unit when entering the off state or standby state.

In an embodiment an optical detector is utilized to detect display device activity, and send a signal to the control unit when an off state or standby state is detected on the display device.

In an embodiment the device 12 may be turned on or off using a remote control connected to the control unit.

The invention described herein is related to the improvement of the design of display device screens during the off or stand-by state. The display device may e.g. be a TV screen, or any other display such as computer monitors.

Mirror

Figure 2:
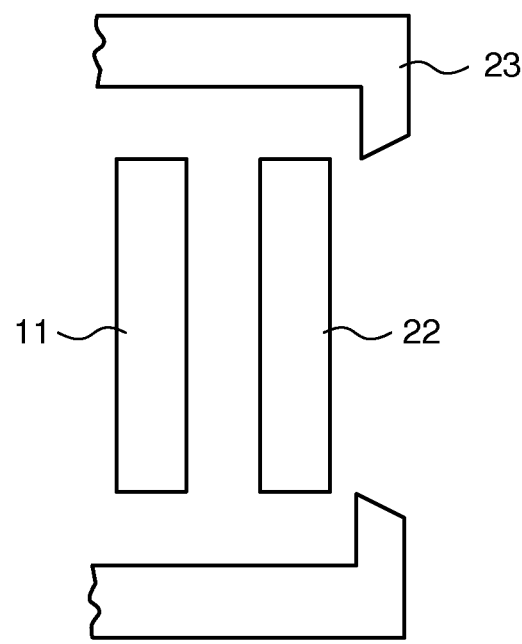
FIGS. 2 to 6 illustrates different embodiments of the system, respectively.

In an embodiment, according to FIG. 2, the device 12 comprises a switchable mirror 22. The mirror may be switched between a transparent mode during the on state of the display device and a high reflective mode during off- or stand-by state of the display device.

In an embodiment the switchable mirror comprises a mirror area having essentially the same size as the size of the display device. The switchable mirror is placed or mounted in front of the display device, as indicated in FIG. 2. For example, the switchable mirror and the display may be mounted into a common frame 23, such as the frame of the display device or into a separate frame.

In an embodiment the switchable mirror 22 is an electrochromic device. Electrochromism is a term used to describe a reversible change of color exhibited by some materials when placed in an electric field. The electrochromic device comprises such a material that exhibits a mirror-like state when no electric field is present, and changes to a transparent state when an electric field is applied, and vice versa.

In an embodiment the switchable mirror 22 is a gasochromic device. The gasochromic device comprises a gasochromic material which exhibits a reversible change of color when alternately exposed to a certain gas, e.g. hydrogen and/or oxygen gases. Commonly known methods of controlling the reversible change of color and transparency may be used. In an embodiment, a gas exhange method is used to change the transparency of the gasochromic device.

In an embodiment the switchable mirror device is directly mounted on at least a part of the screen of the display device. Mounting directly on the display device may be supported by e.g. click on feature that may be provided in the frame of the display device to make an optimal fit.

TOLED

In an embodiment the device 12 comprises a Transparent Organic Light Emitting Diode (TOLED) light source. The TOLED light source may be switched on during the off or stand-by state of the display device producing decorative light. A TOLED light source is a an OLED light source which uses a transparent contact to create a light source that is neither top-only emitting, nor bottom-only emitting, but both top and bottom emitting (transparent). An OLED light source is any Light Emitting Diode (LED) whose emissive electroluminescent layer is composed of a film of organic compounds. The film of organic compounds may possibly be multilayered. This is often used to optimize OLED function, with regard to lifetime, efficiency, or color. Light emitting organic compounds may be either polymers, e.g. poly (p-phenylene vinylene) (PPV), or low-molecular weight compounds, e.g. $AlQ_3$ or $[Eu(ttfa)_3(phen)]$.

Figure 3:
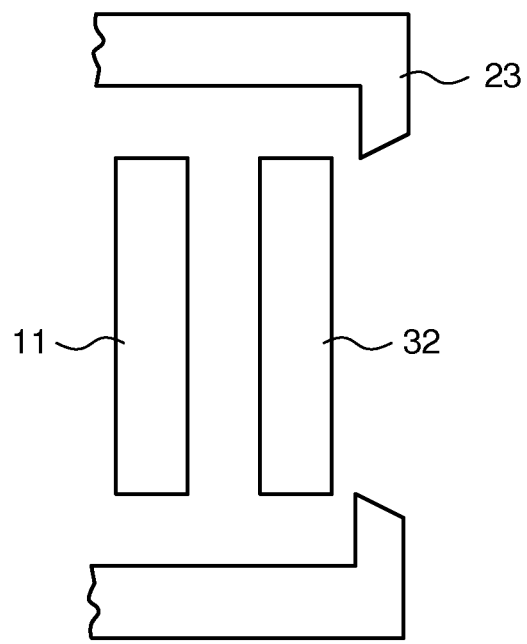

FIG. 3 illustrates the system according to an embodiment, wherein a TOLED device 32 is positioned in front of the display device. The TOLED device may have a light-emitting area of essentially the same size as the display device screen. The TOLED device may be mounted in front of the display device, e.g. in a common frame 23.

Figure 4:
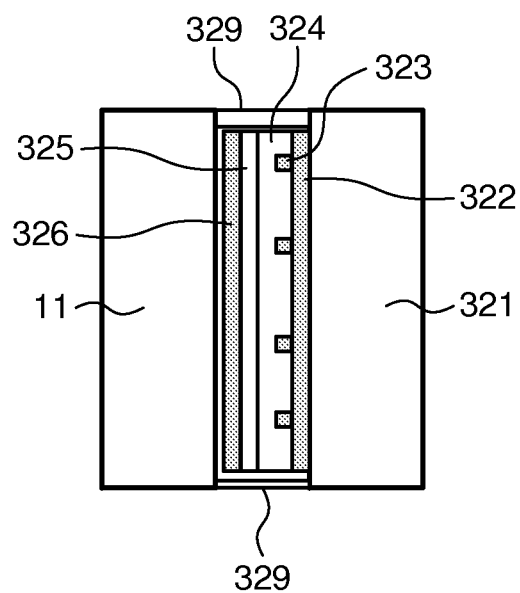

In an embodiment, according to FIG. 4, the glass pane of the display device screen 11 is used as a back cover/encapsulation of a transparent OLED of the same size deposited on a separate substrate 321. In this case, the OLED substrate and the display device glass pane have to be mounted, e.g. glued, on top of each other in a gas-tight way. Additionally, the OLED may be protected against environmental influences using thin-film encapsulation on top of the OLED stack.

The embodiment in FIG. 4 illustrates a display device 11 combined with TOLED device 32. On the TOLED device substrate 321, there is provided an Indium Tin Oxide (ITO) electrode, e.g. anode, 322. The ITO electrode 322 is provided with a metal grid 323. Furthermore, the TOLED device comprises a OLED stack 324, a semi-transparent Ag electrode, e.g. cathode, 325, an optical film 326 to enhance transparency, and an encapsulation 329, with optional glass spacer.

In FIG. 4, the OLED is deposited on the separate substrate 321, with a first electrode, such as an anode, made of a 120 nm thick ITO film 322 combined with a Al metal grid 323. The OLED stack 324 is grown on top of this electrode and covered by second electrode, e.g. a 15 nm thick semi-transparent Ag electrode, acting as a cathode 325. Afterwards, an optical matching layer 326 is applied to increase transparency of the stack. The transparent OLED is finally glued onto the TV screen 11. An optional a spacer 329 can be used. The OLED can reach a transparency of approx. 65% in the spectral region where the human eye is most sensitive. Accordingly, in this embodiment the first electrode, i.e. the electrode on the substrate, is an anode. However in other embodiments the first electrode is acting as a cathode, while the second electrode acts as an anode.

As a typical example the following OLED stack may used in this invention to realize a transparent white stacked OLED:
ITO anode, 120 nm
p-doped layer
Hole transport layer
Blue emitter
Electron transport layer
Charge generation layer
Hole transport layer
Red emitter
Green emitter
Electron transport layer
n-doped layer
Semitransparent Ag layer, 15 nm
Out-coupling layer In an embodiment the TOLED device 32 is provided directly onto the display device screen. For example, it is possible to utilize the glass pane of the display device screen as an OLED substrate on which the OLED is directly deposited.

It is noted that usually in plasma TVs, an additional glass plate coated with a material with low sheet resistance, also referred to as a shielding layer, is placed in front of the display in order to shield high-frequency noise. The coating material may typically be a metal, either in the form of a continuous layer or featuring a grid structure. In this embodiment the TOLED device 32 is deposited directly onto the shielding layer, which is on top of the TV screen or on a separate EMC filter glass pane.

In the case of a continuous shielding layer, one could use this layer simultaneously as an OLED electrode. In order to do so, the shielding layer may have to be thickened in order to achieve a sufficiently low sheet resistance. Alternatively, the shielding layer could be coated with or replaced by a layer of a transparent conductor such as ITO. In terms of transparency, a solution incorporating a transparent conductor is advantageous compared to the full metal electrode.

If the high-frequency noise is shielded by a metal grid rather than a continuous metal layer, this grid can be converted into an OLED electrode by coating it with a layer of (preferably) transparent conductor or a layer of metal. Afterwards the organic layers and further OLED electrode(s) are deposited. The thus completed OLED will finally be encapsulated using an additional glass pane, thin-film encapsulation, or a combination of these methods.

The electrode incorporating the shielding layer may be either the anode or the cathode.

Figure 5:
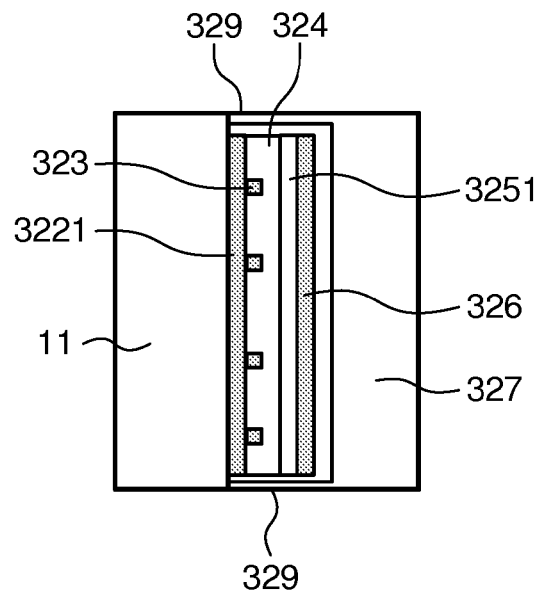

In an embodiment, when the first and second electrode has different transparency, the more transparent electrode is provided closer to the display device than the electrode being less transparent. This means that more light is emitted towards the display than towards the viewer. FIG. 5 illustrates this embodiment, whereby an electrode consisting of a 120 nm thick ITO film 3221 is provided on top of display device screen 11, e.g. combined with Al metal grid 323. This electrode may serve e.g. as an anode. An OLED stack 324 is grown on this electrode and covered e.g. by a 15 nm thick semi-transparent Ag electrode 3251, e.g. serving as a cathode. Afterwards an optical matching layer 326 is applied to increase transparency of the stack. The OLED is finally encapsulated by a glass lid 327 or alternatively by a thin film protective coating. In this way, a transparency of the OLED of approx. 65% transparency can be achieved. In this embodiment only about ⅓ of the OLED light is emitted in the direction of the viewer.

As a typical example the following OLED stack can used in this invention to realize a transparent white stacked OLED:
  ITO anode, 120 nm
  p-doped layer
  Hole transport layer
  Blue emitter
  Electron transport layer
  Charge generation layer
  Hole transport layer
  Red emitter
  Green emitter
  Electron transport layer
  n-doped layer
  Semitransparent Ag layer, 15 nm
  Out-coupling layer In an embodiment, any other OLED stack may be used and placed between anode 322 and cathode 325.

Figure 6:
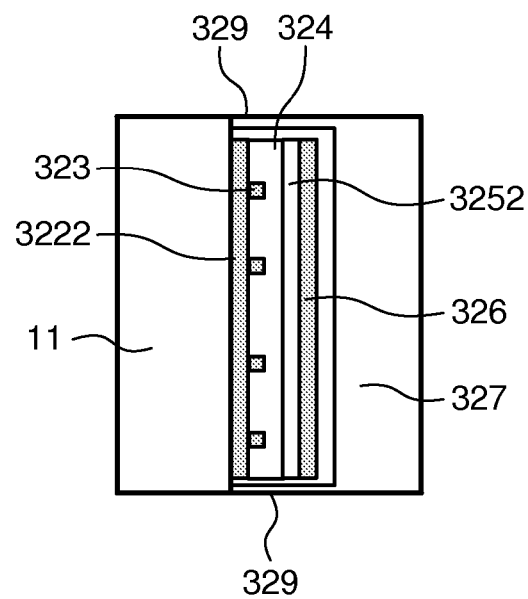

In an embodiment, when the first and second electrode has different transparency, the less transparent electrode is provided closer to the display device than the electrode being more transparent. This means that more light is emitted towards the viewer than towards the display. FIG. 6 illustrates this embodiment, wherein an electrode incorporating the shielding layer, e.g. serving as a cathode, being provided on the display device screen 11. This is favorable in so far as most of the OLED light is emitted in the direction of the viewer. FIG. 6 illustrates a display device 11, an ITO or metal cathode 3222, optional metal grid 323, OLED stack 324, ITO anode 3252, optical film to enhance transparency 326, and glass lid for encapsulation 327.

As a typical example the following OLED stack can used in this invention to realize a transparent white stacked OLED:
  Ag cathode, 15 nm
  n-doped layer
  Electron transport layer
  Blue emitter
  Hole transport layer
  Charge generation layer
  Electron transport layer
  Red emitter
  Green emitter
  Hole transport layer
  Hole-injection layer
  ITO anode, 120 nm
  Out-coupling layer It may be noted that OLEDs above having a certain size (typically ~100 cm$^2$) usually contain metal bars to reduce the sheet resistance of the otherwise transparent anode and cathode, i.e. to distribute the current as evenly as possible over the entire active area. In order not to interfere with the display quality when the display device is on, the grid design has to be adapted to the display, e.g. by making use of the non-active areas of the display.

While in the embodiments described above an (optional) grid is only incorporated into one electrode, we note that following options also exist: a) the other electrode may contain a grid as well, or b) none of the electrodes contains a grid.

The TOLED device 32 according to some embodiments, may be made with different emission wavelengths, and also a color-tunable transparent OLED could be used. For example, when the display device has backlight functionality, the control unit 13 may be configured to control the color of the TOLED device corresponding to the backlight color of the display device to achieve a more attractive effect.

APPLICABILITY

The device according to some embodiments may be used as an integrated decorative front screen of TV sets or decorative add-on screens for flat TV sets. Additional applications are displays and billboards.

The control unit may be any unit normally used for performing the involved tasks, e.g. a hardware, such as a processor with a memory.

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Any combination of the above mentioned embodiments should be appreciated as being within the scope of the invention. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

The invention claimed is:
1. A system comprising:
   a display device being configured to operate in an on state, off state or stand-by state,
   a device connected to the display device, said device comprising a material having a switchable optical configuration, by means of at least one changeable optical characteristic, and an optical detector configured to detect the operating state of the display device and send a control signal to a control unit when said off-state or stand-by state is detected on the display device;

the control unit configured to control the optical characteristic of the device based on the control signal received from the optical detector, wherein said device is a electrochromic device, a gasochromic device, or a Transparent Organic Light Emitting Diode (TOLED) device.

2. The system according to claim 1, wherein the optical characteristic is transparency, and said control unit is configured to control the transparency of said device based on the operation state of the display device.

3. The system according to claim 1, wherein said control unit is configured to apply a voltage over said device, based on the operation state of the display device.

4. The system according to claim 1, wherein said electrochromic or gasochromic device is a switchable mirror having a transparent mode, and a non-transparent mode controllable by the control unit.

5. The system according to claim 1, wherein the device has essentially the same size as the size of the display device screen.

6. The system according to claim 1, wherein the device is mounted into a frame.

7. The system according to claim 1, wherein the device is directly mounted onto the display device screen.

8. The system according to claim 1, wherein the TOLED device comprises a single layered or multi layered film of organic compounds.

9. The system according to claim 1, wherein the display device comprises a shielding layer provided onto the display device screen, and wherein said shielding layer additionally constitutes an electrode for said device.

10. The system according to claim 9, wherein the electrode is an Indium Tin Oxide electrode.

11. The system according to claim 1, wherein said TOLED device comprises a first and second electrode having different transparency.

\* \* \* \* \*